T. SCHOLTZ.
SPRING WHEEL.
APPLICATION FILED JULY 19, 1915.

1,158,567.

Patented Nov. 2, 1915.

INVENTOR
Theodore Scholtz
BY
Aladar Hamburger
ATTORNEY

UNITED STATES PATENT OFFICE.

THEODORE SCHOLTZ, OF NEW YORK, N. Y.

SPRING-WHEEL.

1,158,567.   Specification of Letters Patent.   Patented Nov. 2, 1915.

Application filed July 19, 1915. Serial No. 40,703.

*To all whom it may concern:*

Be it known that I, THEODORE SCHOLTZ, subject of the King of Hungary, residing at New York, in the county of New York and State of New York, have invented certain new and useful Improvements in Spring-Wheels, of which the following is a specification.

This invention relates to spring wheels and has as its principal object to provide a device of this character wherein the spokes are substituted by radially arranged helical coil springs attached to a rigid wheel base, the hub being resiliently carried by said springs and movable in all directions except axially in respect to the wheel base.

A further object is to provide such a device in which the respective movement of the wheel base and hub parts is limited so as to prevent an overstraining of the spring spokes.

A still further object of my invention is to produce a spring wheel for vehicles which is of comparatively simple construction and yet strong and durable, the parts most exposed to wear and tear being easily and quickly exchangeable.

With the foregoing and other objects in view, the invention consists in the particular construction, combination and arrangement of parts hereinafter more specifically described and shown in its preferred form of embodiment in the accompanying drawing, it being understood that modifications and alterations which come within the scope of the claim hereunto appended may be resorted to.

Figure 1:
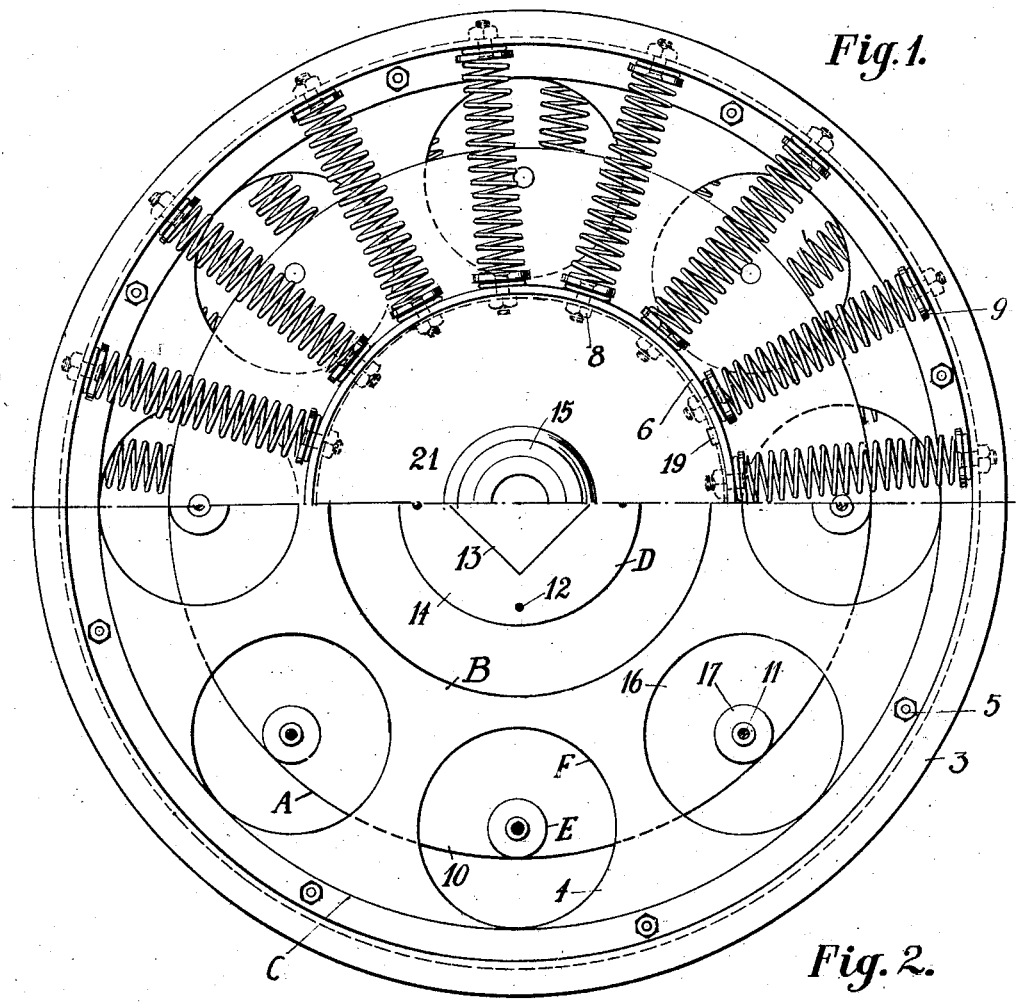
Figure 2:
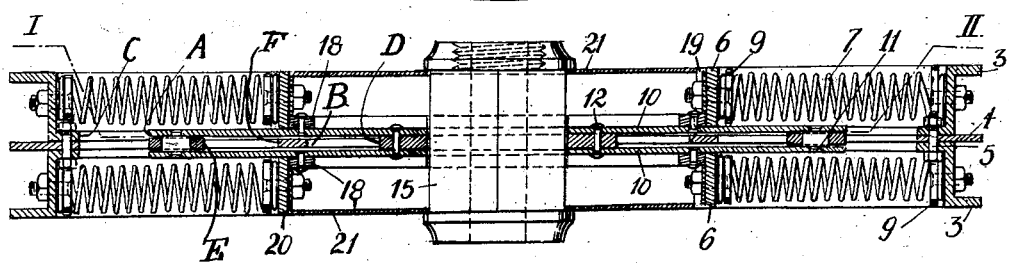

In the drawing: Figure 1 is a front elevational view of a wheel constructed according to my invention, some parts being removed from the lower half thereof, as indicated by the line I—II of Fig. 2. Fig. 2 is a diametrical cross sectional view of my device.

The same part is designated by the same reference character in the separate views.

Referring more particularly to the drawing, 3 is a rigid wheel base member of Z shaped cross section, of which a pair is provided, one on each side of a disk or ring 4 and removably attached thereto by means of screw bolts 5. A pair of inner annular members 6, one to each wheel base member 3, are attached to the latter by a plurality of radially arranged helical coil springs 7, the connection being made by screw bolts 8 and washers 9, so that the springs which correspond to the spokes of an ordinary wheel, may at any time be replaced. The springs connecting one pair of wheel bases and inner rings alternate with those connecting the other pair, so that each spring of one side lies between two springs of the other side. A pair of disks 10 are mounted one on each side of the ring 4, slidably thereon in every direction, except axially, and held together by shouldered rivets 11 near the outer edges and countersunk head rivets 12 near the center of the ring 4. The disks 10 have in their centers square holes 13. Another smaller disk 14, having a similar hole in its center, is placed between the two disks 10 and rigidly connected thereto by the rivets 12. The hub 15 is removably and non-rotatably inserted in the square holes 13 of the disks 10 and 14.

The ring 4 is provided, near its outer edge, with a plurality of circular holes 16 equidistant from each other and from the edges of the ring 4. Within each circular hole 16 is rotatably mounted, on the respective rivet 11, a roller 17, its outer periphery flush with the edges of the disks 10. To each of the disks 10, inside of the rings 6, contiguously and at right angles thereto, are riveted rings 18 provided with recesses continued into the rings 6, wedges such as 19 inserted thereinto serving to connect the two rings and thereby the disks 10 to the rings 6. Linings 20 are also provided inside of the rings 6 at right angles to and contacting with the rings 18, their height being so calculated that covering plates or disks 21 placed on their outer edges are flush with the edges of the rings 6, as may be seen clearly in the drawing.

It is evident from the foregoing that there are two distinct groups of elements in my device, each group being rigid in itself and movable in respect to the other group in every direction, except axially, one group comprising the two symmetrical wheel bases 3 and the ring 4 to which they are rigidly connected, and the other group comprising the hub and associate parts, also rigidly connected to one another. The springs may be considered as the third group of elements connecting the first mentioned two groups to one another. Now, in the normal, concentric, position of all parts (when there is no load on the wheel), as shown in the drawing, each roller 17 lies in the center of the respective circular hole 16. The outer edges A of the disks 10 and the inner edges B of the rings 4 are equidistant from the edges C of the wheel bases 3 and from the edges D of the disks 14 respectively. The same distance is provided between the outer periphery E of the rollers 17 and the edges F of the holes 16. In other words: C—A=B—D=F—E. Owing to this arrangement, in whatever direction the two rigid groups of elements of the wheel may move in respect to each other, whether it be radially, tangentially or torsionally (as when the hub is forcibly driven), the respective movement is confined between limits by the contact of three distinct pairs of edges: that of A with C, B with D and E with F. The distance between each of these pairs of edges being, as aforesaid, absolutely equal (any small differences are quickly equalized by usage), the contact always occurs simultaneously at all contacting edges.

The distance between the contacting edges is so calculated in proportion to the tensional strength of the springs and the loads which they normally carry, that no contact of edges may occur under normal circumstances, but only in case of an extra heavy strain, such as the sudden starting or stopping of the vehicle to which the wheels are attached, or a sudden bump of unusual vehemence or the like in which case the springs would be extended and compressed, respectively, beyond the point of their tensile potency and thus oe deformed, if the contacting edges would not prevent it.

A feature of my device, not to be overlooked, is the prevention of axial respective movement of the two separate groups of elements above mentioned, by the sliding engagement between the ring 4 and the disks 10.

The rim formed on the wheel base may be provided with a metallic, wooden or solid rubber hoop or tire, as desired, means being foreseen for attaching either one thereto, which means also contemplate a partial change in the size of the ring 4 and other structural changes, without, however, departing from the principle of my invention as defined in the claim hereunto appended.

I claim:

A spring wheel comprising, in combination, a hub, a circular plate non-rotatably mounted thereon at the longitudinal center thereof, a pair of annular plates rigidly attached to said circular plate, one on either side thereof, a plurality of rollers rotatably mounted between said annular plates equidistantly distributed around their outer periphery, the edges of said rollers being flush with the outer edges of said annular plates, an annular disk slidably carried between said annular plates, provided with a plurality of equidistant circular openings within each of which one of said rollers is confined, a rim rigidly mounted on the outer periphery of said annular disk and springs connecting said rim to a pair of rings carried one by each of said annular plates, the proportions of said circular plate, annular plates, annular disk, circular openings, rollers and rim being so calculated that in any extreme respective position of these elements their respective edges contact and limit the respective movements thereof simultaneously, substantially as and for the purpose set forth.

In testimony whereof, I affix my signature in the presence of two witnesses.

THEODORE SCHOLTZ.

Witnesses:
W. M. GODDARD,
ALADAR HAMBURGER.

Copies of this patent may be obtained for five cents each, by addressing the "Commissioner of Patents, Washington, D. C."